US012406987B2

United States Patent
Yi et al.

(10) Patent No.: US 12,406,987 B2
(45) Date of Patent: Sep. 2, 2025

(54) DISORDERED ROCKSALT CATHODE MATERIAL AND METHOD OF MAKING IT

(71) Applicant: Wildcat Discovery Technologies, Inc., San Diego, CA (US)

(72) Inventors: Tanghong Yi, San Diego, CA (US); Han Wang, San Diego, CA (US); Bin Li, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 0 days.

(21) Appl. No.: 18/869,645

(22) PCT Filed: Jun. 1, 2023

(86) PCT No.: PCT/US2023/024134
§ 371 (c)(1),
(2) Date: Nov. 26, 2024

(87) PCT Pub. No.: WO2023/235475
PCT Pub. Date: Dec. 7, 2023

(65) Prior Publication Data
US 2025/0174645 A1    May 29, 2025

Related U.S. Application Data

(60) Provisional application No. 63/348,800, filed on Jun. 3, 2022.

(51) Int. Cl.
*H01M 4/505* (2010.01)
*C01G 45/1228* (2025.01)
*H01M 4/02* (2006.01)

(52) U.S. Cl.
CPC ........ *H01M 4/505* (2013.01); *C01G 45/1228* (2013.01); *C01P 2002/52* (2013.01);
(Continued)

(58) Field of Classification Search
None
See application file for complete search history.

(56) References Cited

U.S. PATENT DOCUMENTS 5,563,107 A    10/1996  Dubensky et al.
6,136,287 A    10/2000  Horne et al.
(Continued)

FOREIGN PATENT DOCUMENTS

CN    107546384 A    1/2018
CN    109987650 A    7/2019
(Continued)

OTHER PUBLICATIONS

Chapter II Remarks—PCT/US23/24134 (Year: 2024).*
(Continued)

*Primary Examiner* — Colin W. Slifka
(74) *Attorney, Agent, or Firm* — Young Basile Hanlon & MacFarlane, P.C.

(57) ABSTRACT

It has been discovered that improved disordered rocksalts comprise of Mn are made by method comprising mixing a lithium compound with a metal precursor compound comprised of Mn having an oxidation state of 2 to form a mixture and heating the mixture to a temperature to form a disordered rocksalt structure. The method may realize improved cycle life with altered metal and oxygen redox of the disordered rocksalt.

20 Claims, 6 Drawing Sheets

(52) U.S. Cl.
CPC ...... *C01P 2002/72* (2013.01); *C01P 2004/03* (2013.01); *C01P 2006/40* (2013.01); *H01M 2004/028* (2013.01)

(56) References Cited

U.S. PATENT DOCUMENTS

| | | | |
|---|---|---|---|
| 7,211,237 | B2 | 5/2007 | Eberman et al. |
| 8,535,832 | B2 | 9/2013 | Karthikeyan et al. |
| 8,722,250 | B2 | 5/2014 | Park et al. |
| 9,048,495 | B2 | 6/2015 | Sun et al. |
| 9,083,062 | B2 | 7/2015 | Kumar et al. |
| 9,093,712 | B2 | 7/2015 | Kato et al. |
| 9,692,043 | B2 | 6/2017 | Takeuchi et al. |
| 9,780,363 | B2 | 10/2017 | Ceder et al. |
| 9,865,872 | B2 | 1/2018 | Nakahara et al. |
| 10,280,092 | B2 | 5/2019 | Carroll et al. |
| 10,497,928 | B2 | 12/2019 | Asano et al. |
| 10,811,671 | B2 | 10/2020 | Natsui et al. |
| 10,833,315 | B2 | 11/2020 | Nakatsutsumi et al. |
| 10,833,322 | B2 | 11/2020 | Natsui et al. |
| 10,903,483 | B2 | 1/2021 | O'Neill et al. |
| 10,957,901 | B2 | 3/2021 | Ceder et al. |
| 10,978,706 | B2 | 4/2021 | Ceder et al. |
| 11,870,056 | B2 | 1/2024 | Yi et al. |
| 2010/0086854 | A1 | 4/2010 | Kumar et al. |
| 2013/0095385 | A1 | 4/2013 | Tran et al. |
| 2014/0099549 | A1 | 4/2014 | Ceder et al. |
| 2014/0138591 | A1 | 5/2014 | Yoon et al. |
| 2016/0233549 | A1 | 8/2016 | Tiruvannamalai et al. |
| 2018/0034042 | A1 | 2/2018 | Carroll et al. |
| 2018/0320284 | A1 | 11/2018 | Opalka et al. |
| 2019/0088945 | A1 | 3/2019 | Ceder et al. |
| 2020/0020943 | A1 | 1/2020 | Natsui et al. |
| 2020/0194790 | A1 | 6/2020 | Ceder et al. |
| 2021/0005883 | A1 | 1/2021 | Natsui et al. |
| 2021/0167373 | A9 | 6/2021 | Ceder et al. |
| 2022/0059816 | A1 | 2/2022 | Yi et al. |

FOREIGN PATENT DOCUMENTS

| | | |
|---|---|---|
| CN | 111952560 A | 11/2020 |
| WO | 2004110699 A2 | 12/2004 |
| WO | 2011131553 A2 | 10/2011 |
| WO | 2014055665 A2 | 4/2014 |

OTHER PUBLICATIONS

Cuartero, V. et al., "X-ray absorption and emission spectroscopy study of Mn and Co valence and spin states in TbMn1-x CoxO3.", Phys. Rev B 94, 155117; published Oct. 12, 2016. DOI: 10.1103/PhysRevB.94.155117; 22 pages.

Han, Binghong et al. "Tailoring Alumina Based Interphases on Lithium Ion Cathodes", Journal of the Electrochemical Society, 165 (14) A3275-A3283 (2018) (10 pages).

Huang, Baojun et al., "Enhanced Cycling Stability of Cation Disordered Rock-Salt Li1.2Ti0.4Mn0.4O2 Material by Surface Modification With Al2O3", Frontiers in Chemistry, Mar. 2019, vol. 7, Article 107 (8 pages).

Lee et al. "Mitigating oxygen loss to improve the cycling performance of high capacity cation-disordered cathode materials." Nat. Commun. 8:981 (10 pages).

Li, Dong et al., Surface Coating of Li-rich Manganese-Based Layered Cathode Materials—A Short Review.

Lun, Zhengyan et al., "Cation-disordered rocksalt-type high-entropy cathodes for Li-ion batteries", Nature Materials, vol. 20, Feb. 2021, pp. 214-221 (30 pages).

Wang et al. "A disordered rock-salt Li-excess cathode material with high capacity and substantial oxygen redox activity: Li1.25Nb0.25Mn0.5O2." Electrochemistry Communications 60; 2015 (4 pages).

Yabuuchi et al. "High-capacity electrode materials for rechargeable lithium batteries: Li3NbO4-based system with cation-disordered rocksalt structure" Proc. Natl. Acad. Sci. 2015; (6 pages).

Yu, Zhenlu et al. "Synthesis and Redox Mechanism of Cation-Disordered, Rock-Salt Cathode-Material Li—Ni—Ti—Nb—O Compounds for a Li-Ion Battery", ACS Appl. Mater. Interfaces 2019, 11, 3577-35787 (19 pages).

International Search Report and Written Opinion issued in co-pending International Application PCTUS2023024134 dated Nov. 2, 2023 (15 pages).

\* cited by examiner

DISORDERED ROCKSALT CATHODE MATERIAL AND METHOD OF MAKING IT

TECHNICAL FIELD

The present invention is in the field of battery technology.

BACKGROUND

Lithium metal oxides have been used to formulate cathode materials for lithium ion batteries. The cathodes are derived from a few basic crystallographic structure types, such as spinels, olivines, and layered oxide structures. The layered oxide structures have included lithium-excess type structures, where additional lithium is present in the structure.

Recently, attention has been focused on disordered rocksalt structures, such as those formed from particular lithium metal oxides. Compounds represented by the formula:

$$xLi_3NbO_4 \cdot (1-x)LiMO_2 \qquad (1)$$

where M is a divalent or trivalent cation, have been shown to be a promising class of transition metal oxides for use as cathodes in lithium ion batteries. The compounds of formula (1) are considered a disordered rocksalt in which a random atomic arrangement of lithium and transition metal ions are packed in a closely-packed cubic structure. These disordered rocksalt compositions offer the ability to contain up to 3 lithium atoms per formula unit, which is more than the conventional lithium-excess layered materials. Formula (1) can be transformed and represented as $Li_xM_yN_zO_w$.

The disordered rocksalt structure is an attractive cathode material for next generation lithium ion batteries due to a greater specific energy density (e.g., a higher theoretical energy density) than state-of-the-art cathode materials, such as layered lithium metal oxide structures. For example, certain disordered rocksalt structure materials have a theoretical gravimetric energy density of about 1120 Wh/kg, while a $LiMn_2O_4$ active material has a theoretical gravimetric energy density of about 492 Wh/kg and a $LiMn_{1.5}Ni_{0.5}O_4$ has a theoretical gravimetric energy density of about 691 Wh/kg. This energy density is especially appealing when lower cost raw materials are used as components in the disordered rocksalt structure, such as manganese. As such, the disordered rocksalt materials can achieve relatively high energy density with relatively low material cost. In order to achieve comparable energy density, known cathode materials require higher-cost raw materials, such as cobalt or nickel.

The challenge of disordered rocksalt materials is relatively poor conductivity. The reduction of the disordered rocksalt particle size by milling and then re-agglomerating the milled particles has been described to improve the conductivity by shortening the electron and ion transport pathways (U.S. Pat. Publ. No. 2022/0059816).

BRIEF SUMMARY

It has been discovered that improved disordered rocksalt materials may be formed by use of a metal in a precursor compound that is at a lower oxidation (valence) state prior to heating. It is not entirely clear mechanistically. The particles formed have been found to have smaller particle or grain size than ones formed using precursor compounds with metals at a higher oxidation state with others variables being equivalent.

Illustratively, the method comprises mixing a lithium compound with a metal precursor compound comprised of Mn having an oxidation state of 2 to form a mixture and heating the mixture to a temperature to form a disordered rocksalt structure. The Mn having an oxidation state of 2 may also be formed as follows. Forming a mixture comprised of a Mn compound having an oxidation state greater than 2 with at least one other metal precursor compound in the absence of lithium compound to a temperature to form the precursor (also referred to as an intermediate precursor). This intermediate precursor formed is comprised of Mn having a reduced oxidation state of 2. The resulting intermediate precursor may then be mixed with a lithium source and heated to form the disordered rocksalt.

The method may produce a disordered rocksalt having a metal redox capacity and an oxygen redox capacity, wherein the metal redox capacity is greater than the oxygen redox capacity. Likewise, the method may produce a disordered rocksalt having a metal redox capacity that is at least partially attributable to the presence of a Mn in a reduced 2+ valence state, which is believed, without being limiting, may contribute to an increased metal redox capacity and improved cycle life. For example, the method may enable the formation of a disordered rocksalt comprised of Li, Mn and O having least 1% by mole of the Mn in the 2+ valence state. The valance state and proportion of Mn in the 2+ valence state may be determined by known methods such as X-ray absorption spectroscopy such as described in Phys. Rev. B 94, 155117, 12 Oct. 2016. Desirably, at least 2%, 5%, 10%, 15%, 20%, 25%, 30%, 35%, 40%, or 50% to essentially all of the Mn present in the disordered rocksalt is in the 2+ valence state.

The disordered rocksalts may be used in electrodes of electrochemical cells. The disordered rocksalt materials may be used to form a cathode. The electrochemical cells that utilize the disordered rocksalt materials may be primary or secondary lithium ion batteries. The lithium ion batteries are desirably a secondary battery.

DETAILED DESCRIPTION

Figure 1:
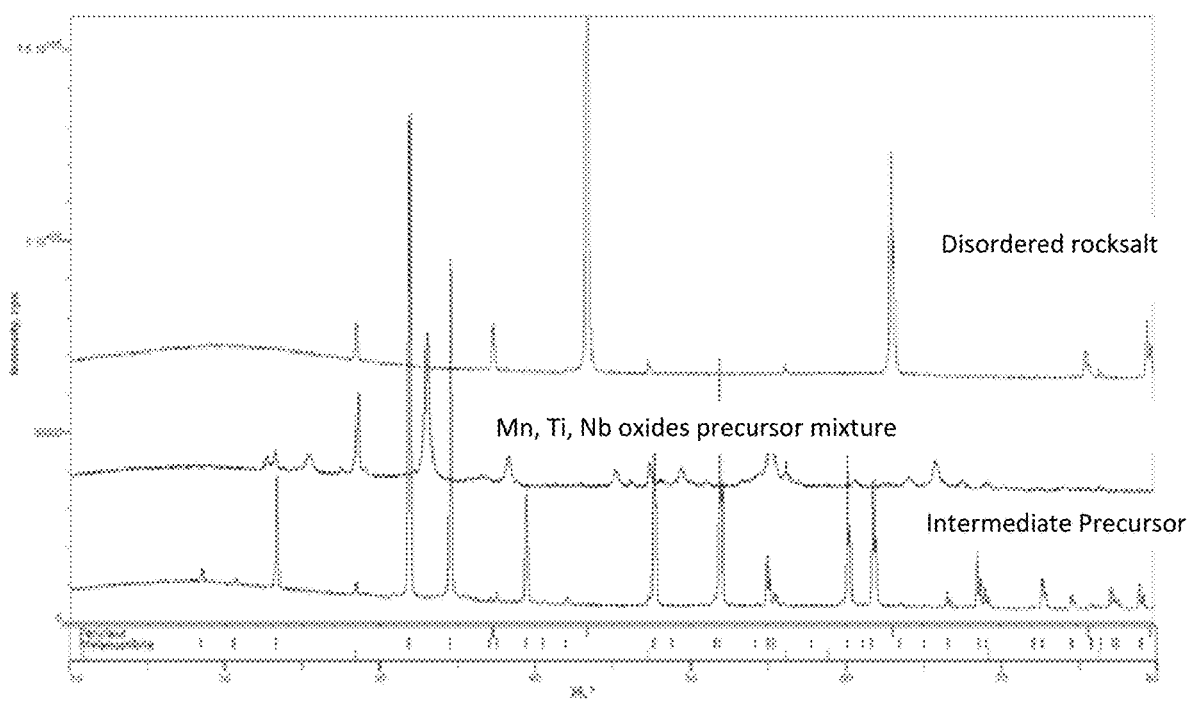
FIG. 1 is an X-ray pattern of an intermediate oxide used in the method of the invention.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

To the extent certain battery characteristics can vary with temperature, such characteristics are specified at 30 degrees C., unless the context clearly dictates otherwise.

Ranges presented herein are inclusive of their endpoints. Thus, for example, the range 1 to 3 includes the values 1 and 3 as well as the intermediate values.

In a disordered rocksalt composition, both lithium and a transition metal occupy a cubic close-packed lattice of octahedral sites. In electrochemical reactions, lithium diffusion proceeds by the lithium hopping from one octahedral site to another octahedral site via an intermediate tetrahedral site. Lithium in the intermediate tetrahedral site is the activated state in lithium diffusion. The activated tetrahedral lithium ion shares faces with four octahedral sites as follows: (i) the site previously occupied by the lithium ion itself; (ii) the vacancy the lithium ion will move into; and (iii & iv) two sites that can be occupied by lithium, a transition metal, or a vacancy.

The method may be used to make any disordered rocksalt such as those known in the art useful to make battery cathodes comprised of Mn (e.g., U.S. Pat. No. 10,280,092). The method may use long annealing times yet result in as small or smaller grains of the disordered rocksalt. For example, all other things being equivalent, the method realizes a grain or particle size the same or smaller than a method not employing a manganese +2 precursor compound even when heated for longer times (i.e., 2, 5 or 10× at the same temperature). This allows for a more robust method for forming disordered rocksalts.

An illustrative disordered rocksalt may be any that contain Mn such as described in U.S. application Ser. No. 15/222,377 (now U.S. Pat. No. 10,280,092), which is incorporated by reference herein in its entirety. Other disordered rocksalts as described in U.S. Pat. Nos. 10,811,671; 9,692,043; 9,093,712; 9,083,062; 8,722,250; 8,535,832; 10,833,322; 10,497,928; 9,865,872; and 9,780,363, when comprised of Mn may be useful and are incorporated herein by reference. The disordered rocksalt composition generally includes lithium, transition metals, and oxygen. One or more of the transition metal or oxygen sites may be doped for improved electrochemical performance. In a non-limiting example, the oxygen site is doped with fluorine. A general formula for doping at the oxygen sites is:

$$Li_xN_yM_zO_{2-a}F_a \qquad (1)$$

where $1.0<x<1.65$; $0\leq y<0.55$; $0.1<z<1$; $0\leq a<0.5$; N is one of Ti, Ta, Zr, W, Nb, or Mo; and M is one of Ti, V, Cr, Mn, Fe, Co, Ni, Cu, Zn, Al, Zr, Y, Mo, Ru, Rh, Sn, Bi or Sb so long as Mn is present. Other dopants such as Na and Mg may be incorporated substituting for the Li at minor concentrations such a 0.1% to 10% by mole of the Li and dopant present. These compositions have demonstrated excellent specific capacity or energy density, such as ~350 mAh/g at 55° C. and C/40, and ~300 mAh/g at 30° C. and C/15. The disordered rocksalt may be one where "a" is zero. Other anions may be further incorporated substituting for the O and/or F such as described in copending application having a Title, Disordered Rocksalt Material and Method of Forming, by Tanghong Yi filed contemporaneously herewith, incorporated herein by reference. Desirably, the disordered rocksalt is one where N is Nb and M is Mn and Ti. When Mn and Ti are present, it may be desirable for the Mn/Ti to be from 1 to 50, 25 or 10. When making a cathode, the disordered rocksalt may be mixed with other additives that may introduce a useful attribute such as to bind or improve electrical conductivity of the disordered rocksalt powder. For example, the disordered rocksalt powder may be mixed or coated with carbon particulates to improve the electrical conductivity. Typically, the amount of carbon by weight is such that the weight ratio of the disordered rocksalt/carbon is 100, 50, 30, 20, 10 to about 2 or 5.

The method may produce a disordered rocksalt that displays a metal redox capacity and an oxygen redox capacity, wherein the metal redox capacity is greater than the oxygen redox capacity. The capacity due to the transition metals is taken as the sloped curve from 0 to about 150 mAh/g in the capacity Q (mAh/g) versus voltage (V) curve (voltage between about 3 volts to 4.2 volts). After which the capacity obtained over the high voltage plateau is understood to be due to the oxygen anion (up to about 4.5 volts). The metal redox capacity may be at least 5%, 10% or greater than the oxygen redox capacity as measured by the area under the dQ/dV curve, when compared to a disordered rocksalt cathode not made by the method with all other things being essentially equivalent.

It has been surprisingly discovered when making improved disordered rocksalts comprised of Mn, they may be made by mixing a lithium compound with a metal precursor compound comprised of Mn, wherein the Mn has an oxidation state of 2 to form a mixture. For example, the mixture is comprised of MnO or mixed metal oxide where at least a portion of the Mn is in the 2 oxidation state. Examples may include $MnO$, $MnCO_3$, $Mn_3O_4$, $Mn(NO_3)_2$. Desirably, at least 25%, 50%, 75%, 90% to essentially all of the metal precursor compound comprised of Mn by weight present in the mixture has an Mn oxidation state of 2. The Mn precursor present in the mixture may solely be MnO.

The mixture may be formed by any suitable method such as those known in the art with U.S. Pat. Pub. No. 2022/0059816 being illustrative and incorporated herein by reference. To form the mixture, metal precursor compounds and lithium compound are mixed based on the desired composition of the disordered rocksalt. One or more of the precursors may be metal compounds comprised of oxygen, fluorine and one or more P, S and N, such as oxides, hydroxides, oxynitrides, nitrides, nitrates, sulfides, sulfates, phosphate, phosphites, fluorides and combinations thereof. Examples of precursors may include $Mn_2O_3$, $LiOH$, $Nb_2O_5$, $LiF$, $NbF_5$, and/or the like so long as there is a sufficient amount of Mn precursor that has the 2 oxidation state as described above. The mixture may include one of more compound that may introduce a substitute for the O or F such as ones having S, P, N or combination thereof.

The Mn having an oxidation state of 2 may be formed by mixing an Mn having an oxidation state greater than 2 (e.g., $Mn_2O_3$) with other metal precursor compounds that maybe in the same stoichiometric ratio desired in the disordered rocksalt or a portion of the desired rocksalt. The mixture of a Mn compound having an oxidation state greater than 2 with at least one other metal precursor compound may be made by any suitable method such as described herein when making the desired disordered rocksalt. This intermediate mixture may then be heated to a temperature to form an intermediate precursor in the absence of lithium and in an atmosphere (e.g., inert atmosphere or oxygen containing) that realizes a mixed metal compound where at least a portion (e.g., 50%, 75%, 90% to all of the Mn has a 2 oxidation state). If desired, the intermediate precursor may be heated in an oxygen containing atmosphere containing no lithium to form a mixed metal oxide intermediate comprised of Mn having the 2 oxidation state. Any useful temperature and time may be used to form the intermediate precursor. Generally, the forming of the intermediate precursor may employ temperatures, atmospheres and hold times such as described for forming the disordered rocksalt, but desirably do not contain oxygen. Higher temperatures may be used if useful, but this may require further or more milling to realize the desired particle size when mixing with the lithium compound.

Desirably, the precursors may be mixed, at the desired amounts to realize the desired disordered rocksalt stoichiometry, in a liquid such as water or organic solvent to make a suspension (one or more of the precursors may be dissolved and precipitated upon removal of the solvent). The milling may be performed by any method useful to realize the desired particle size with examples being a micromedia mill, planetary mill or other comminution method (e.g., stirred, ultrasonic induced or vibratory mills). The particles may have an average particle size that is at most 2 micrometer, 1 micrometer, 400 nanometers (nm), 200 nm, or 100 nm to 5 or 10 nm. An Example of a suitable micro bead mill is a Buhler PML2 mill (Buhler Group). Suitable milling may be performed in commercially available stirred mills such as those available from Buhler Group (Germany) and Netzsch GmbH (Germany); sonic mills available from Resodyn Corporation. (Butte, MT) and planetary mills available from Glen Mills Inc., (Clifton, NJ) and Retsch GmbH (Germany). The size may be determined by any suitable method such as those known in the art including, for example, micrographically or by laser light scattering.

The milling media may be any useful for milling ceramic particles without causing undo contamination or intended contribution to the composition of the mixture. The milling media may be any useful shape such as spherical, ellipsoidal or cylindrical. Desirably, the milling media is spherical. The milling media may be a ceramic, metal or ceramic metal composite (e.g., WC/Co). The milling media may be any useful for milling the precursors without causing deleterious contamination. Examples of milling media include those comprised of zirconium such as cubic stabilized zirconia (e.g., stabilized with one or more of Mg, Ca, Y, Ce, Al and Hf), zircon, silicon carbide, WC/Co, mixed carbides such as those described in U.S. Pat. No., 5,563,107 and WO 2004/110699, incorporated herein by reference. Cubic stabilized zirconia milling media that are suitable may be obtained from Chemco Advanced Material (Suzhou) Co., Ltd., China. Likewise, autogenous milling such as use of a metal oxide desired in the composition may be used as the milling media.

The suspension of precursor particles may then be dried by any suitable method such as spray drying. Other drying methods involving evaporation, heating, application of vacuum, critical fluid drying or freeze drying may be employed. The spray drying may be performed using any known commercially available spray dryer such as a mini spray dryer, such as the Buchi B-290 model The dried mixture of precursor particles may then be heated to an annealing temperature. The annealing temperature causes the precursors to react and form the disordered rocksalt. Desirably, the temperature and time are such that the resulting disordered rocksalt does not fuse into a monolithic fused mass, but retains the dried mixture morphology such as spray dried agglomerates of the precursor particles. The annealing temperature may be from 500° C., 750° C. to 900° C., 1000° C. or 1200° C. The annealing temperature may be held for any useful time such as from 10 minutes, 1, 2, 3, or 5 hours to 12 or 24 hours. Surprisingly, even at longer annealing times, the crystal growth of the mixture of the present invention is suppressed substantially compared to a mixture only having Mn precursors with oxidation state of 3. That is, it has been discovered that the particles maintain a small size and improved performance such as improved cycle life and conductivity due to the small size. In addition, since the particles are able to maintain a smaller size at temperature, the stoichiometry may more precisely be tailored using differing oxygen containing atmospheres (i.e., partial pressure of oxygen over longer periods of time, which may be varied during the annealing to form the disordered rocksalt). For example, it may be desirable to anneal at a high temperature such 750° C. to 1200° C. under a low or no oxygen (inert gas such as noble gas or nitrogen) containing atmosphere for a time to form the disordered rocksalt, but then reduce the temperature and anneal at a lower temperature (e.g., below 750° C. to about 400° C. or 500° C.) under an oxygen containing atmosphere such as air, dry air, or oxygen in nitrogen or inert gas at any desirable partial pressure). In other words, two or more annealing temperature may be employed to form the disordered rocksalt. The hold time for each annealing temperature may be any as described above.

The annealing may be performed under any suitable atmosphere, which may be static or flowing or combination thereof and may be varied depending on the hold temperature employed in the method. The atmosphere may be a noble gas, nitrogen, atmospheric air or dry air and any combination to realize a desired partial pressure of one or more gases. The annealing conditions may be selected based on the composition of the disordered rocksalt precursors.

The disordered rocksalt that is formed may be mixed by any method with milling as described herein being a suitable method other components useful to make an electrode. For example, carbon may be added. The carbon may be added via a suspension and spray dried to form spray dried particles. The carbon may include acetylene black, carbon black, carbon fiber, graphite, carbon nano-tube, KJ600, and/or the like. The carbon may be milled at a ratio in which the disordered rocksalt powder represents a majority and the carbon precursors represent a minority. For example, the disordered rocksalt and carbon are each present in an amount such that the amount of disordered rocksalt/amount of the carbon by weight may be a ratio of 100/1, 50/1 30/1, 20/1 or 10/1 to 5/1, 1.5/1 or 1/1.

The disordered rocksalt may be used to form a cathode by any suitable method such as those known in the art. For example, the disordered rocksalt powder may be mixed with a binder such as a polymer useful to make cathodes (e.g., polyfluoropolymer such as polyvinylidene fluoride) and one or more solvents to form a slurry. Non-limiting examples of the one or more solvents may be an aprotic polar solvent such as methyl-2-pyrrolidinone (NMP). The slurry may then be deposited on a metal current collector (e.g., stainless steel, aluminum, or any suitable conductive metal thin sheet) and the solvent removed to form the cathode.

Desirably the disordered rocksalt of the cathode has an average secondary particle size at least 1 to 20 micrometers. Each of the secondary particles is an agglomeration of primary particles. The DRS primary particles desirably have an average particle size as described previously and may contain other particles that may be useful such as increasing the electrical conductivity (e.g., carbon or other inorganic high ionic conductive particles).

The disordered rocksalt cathode may be used in a rechargeable lithium ion battery cell. The battery cell includes the cathode, an anode, separator and electrolyte. The battery or battery cell may be formed in any suitable atmosphere such as common in the art. For example, a high purity argon atmosphere may be used to limit any undesirable contamination from species present in atmospheric air.

EXAMPLES

Example 1

Figure 2:
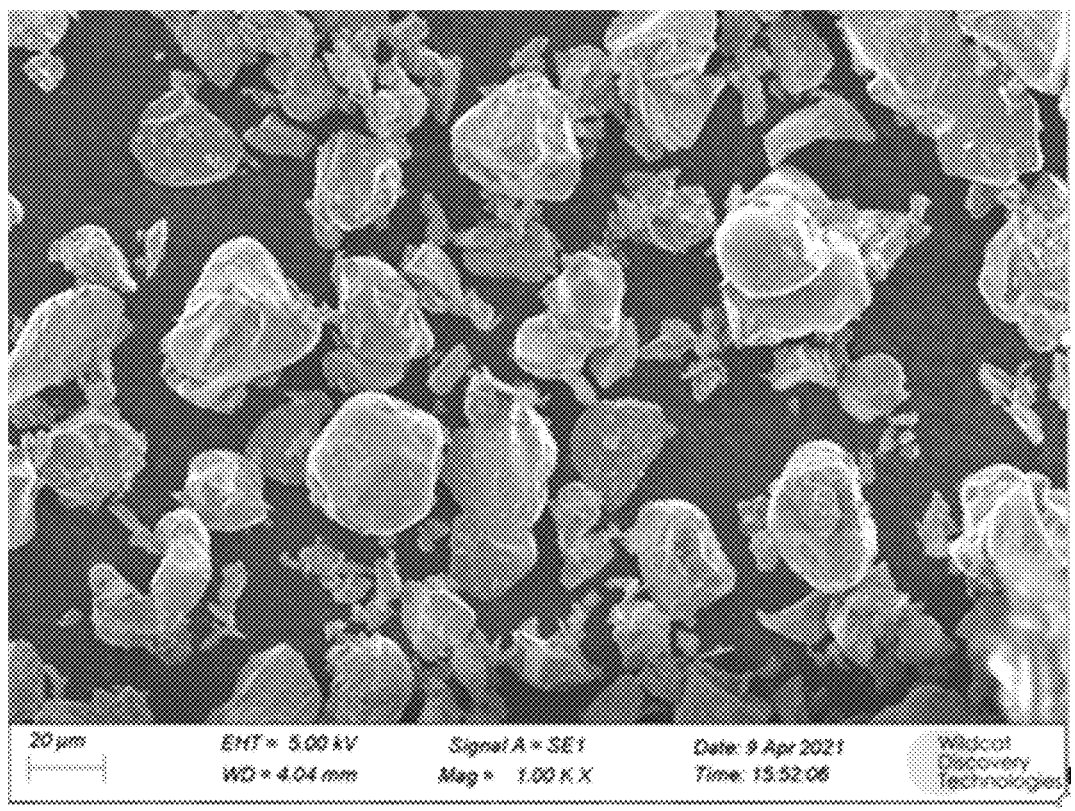
FIG. 2 is a scanning electron micrograph (SEM) of a disordered rocksalt of this invention.

Disordered rocksalt materials are synthesized in multiple steps. Typically, stoichiometric amounts of precursors of all oxides ($Mn_2O_3$, $TiO_2$, and $Nb_2O_5$), not including lithium precursor, are mixed and milled in micro media Buhler mill with ceramic beads in deionized water to achieve ~10% solid suspension then spray dried. The dried mixture of oxides are annealed at 1000° C. for 12 h in an inert atmosphere to form an intermediate precursor (trigonal, R-3) where the Mn is believed to be essentially in the Mn +2 oxidation state with the X-ray diffraction pattern shown in FIG. 1 using melanostibite as a reference. The annealed powder is mixed with lithium precursors ($Li_2CO_3$ and LiF) is ball milled with a planetary ball mill using zerconia media for 3 hours to prepare a mixture of the lithium compounds and intermediate metal oxide The mixture is then annealed at 900° C. for 12 hours under flowing argon to obtain the disordered rocksalt phase, which is shown in FIG. 2.

Example 2

The same stoichiometric amounts of precursors (MnO, $Li_2CO_3$, LiF, $Nb_2O_5$, and other dopants in oxides or fluorides form) are mixed in deionized water to make a suspension, which was ball milled with a planetary ball mill in the same manner as Example 1 to prepare a homogeneous mixture of all precursors including the lithium compounds. The mixture is dried at 100° C./12 h under air before being annealed at 900° C. for 12 hours under flowing argon to obtain the disordered rocksalt.

Comparative Example 1

Figure 3:
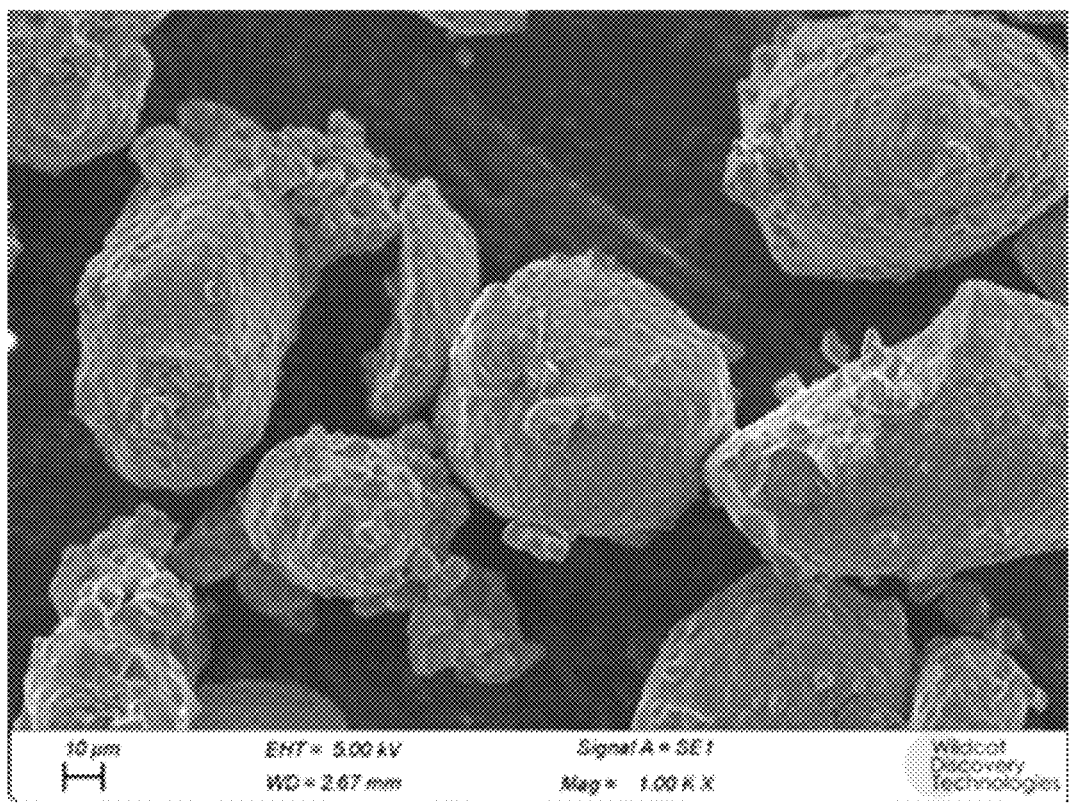
FIG. 3 is SEM of a disordered rocksalt not of this invention
Figure 4:
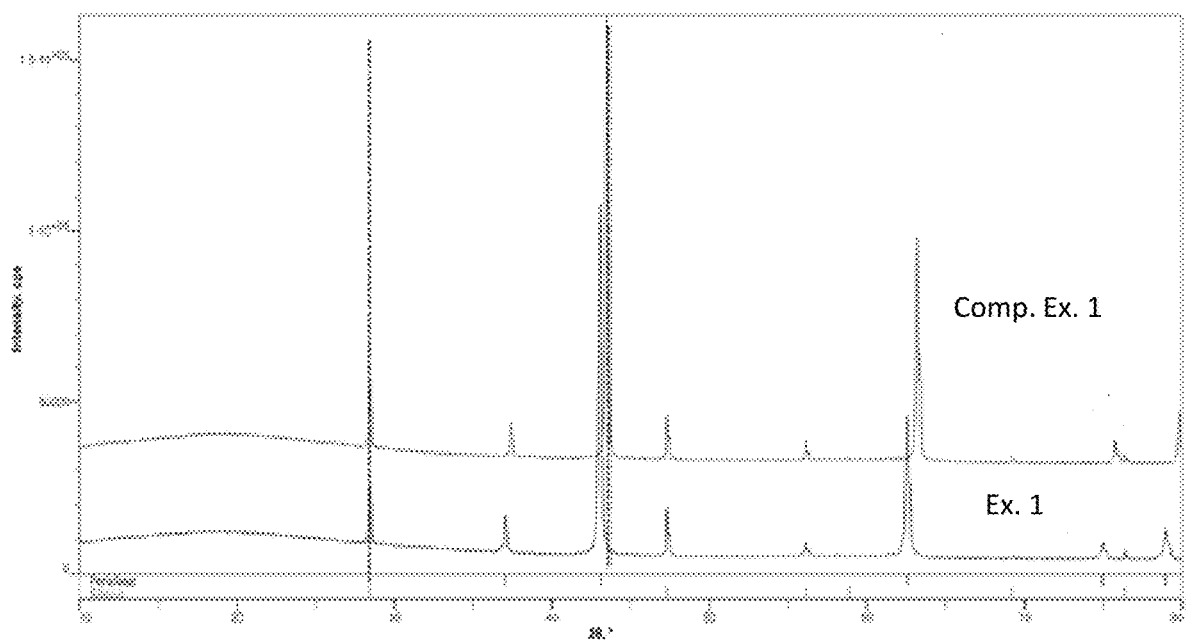
FIG. 4 is an X-ray diffraction pattern of a disordered rocksalt of this invention and a disordered rocksalt not of this invention.

The same stoichiometric amounts of metals and lithium precursors are formed into a mixture in the same manner as in Example 2, but the MnO was replaced by $Mn_2O_3$. The as formed particles of disordered rocksalt are shown in FIG. 3. From FIGS. 2 and 3 it is evident that the particle size is substantially smaller for Example 1 compared to Comparative Example 1. FIG. 4 shows the X-ray diffraction pattern of the disordered rocksalt of Example 1 and Comparative Example 1. From the X-ray diffraction pattern, it is evident that there is a difference in the lattice parameters as shown by the shift in the peak locations (see peaks around 43° and 63° 2θ). The X-ray diffraction was determined using a Rigaku Miniflex benchtop X-Ray diffractometer.

The disordered rocksalt of Example 1 and Comparative Example are milled with the same carbon nanotubes in a planetary ball mill with zirconia media, in a 93:7 (powder to carbon ratio) for making a cathode. Battery cells for testing electrochemical behavior are formed in a high purity argon filled glovebox (M-Braun, $O_2$ and humidity content <0.1 ppm). The cathode is prepared by mixing the disordered rocksalt powder with poly(vinylidene fluoride) (Sigma Aldrich) and 1-methyl-2-pyrrolidinone (Sigma Aldrich) and conductive carbon to give a ratio of active material:carbon: PVDF=90:7:3, and the resulting slurry was deposited on a stainless steel current collector and dried to form a composite cathode film (~2 mg/cm$^2$). For the anode, a thin Li foil was cut into the required size. Each battery cell included the composite cathode film, a polypropylene separator, and a lithium foil anode. An electrolyte (1.0M $LiPF_6$ in EC/EMC (1:2 v/v)) containing lithium hexafluorophosphate ($LiFP_6$) in a mixture of ethylene carbonate (EC) and ethyl methyl carbonate (EMC) with an additive is used. The battery cell is sealed and cycled between 1.5-4.6V at 30° C. at C/20 formation rate and C/3 cycling rate, where 1 C=300 mAh/g.

Figure 5:
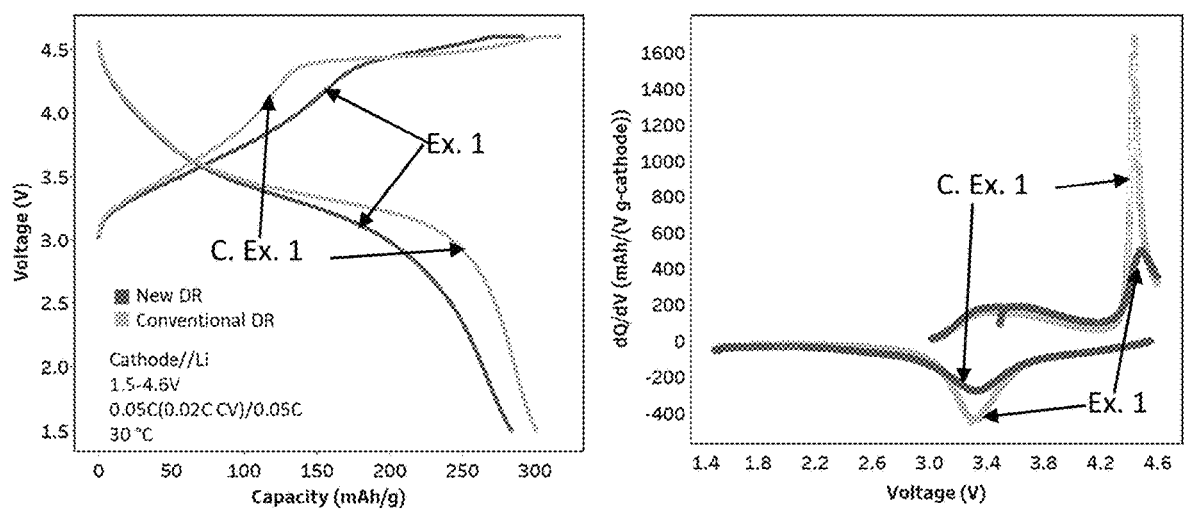
FIG. 5 is an initial charge and discharge curve of a battery cell employing the disordered rocksalt of this invention.
Figure 6:
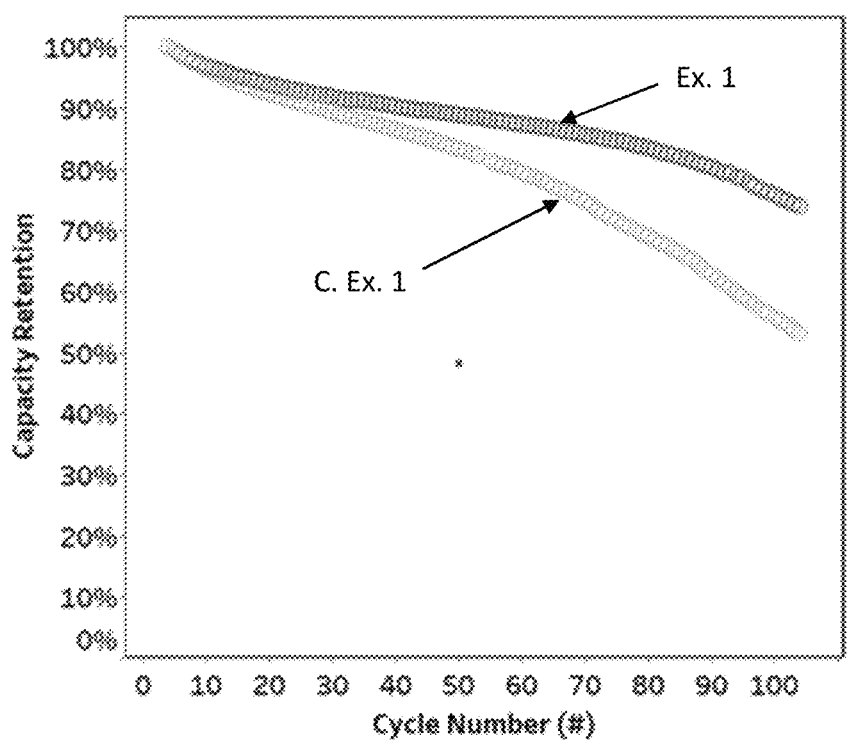
FIG. 6 is a capacity vs. cycle of a battery cell employing the disordered rocksalt of this invention and a battery cell employing a disordered rocksalt not of this invention.

The disordered rocksalt of Example 1 exhibits more capacity from the transition metal redox and less from the oxygen anion redox. This is shown below by the shift capacity at which you see the high voltage plateau between 150 to 200 mAh/g. The capacity due to the transition metals is the sloped curve from 0 to about 150 mAh/g. After which the capacity obtained over the high voltage plateau is due to the oxygen anion. The disordered rocksalt of Comparative Example 1 exhibits ~130 mAh/g capacity from metal redox and ~186 mAh/g oxygen redox, while the disordered rocksalt of Example 1 shows ~170 mAh/g metal redox capacity and ~120 mAh/g oxygen redox capacity during initial charge. Compared to the disordered rocksalt of Example 1, the larger charge capacity from anion redox for the disordered rocksalt of Comp. Ex. 1 is clearly shown by the larger area under the peak around 4.5 V (See FIG. 5 showing the initial charge and discharge of the cells employing the disordered rocksalt of Examples 1 and Comp. Ex. 1) The initial charge and discharge is at a C rate of C/20. The cycle life is determined by cycling at C/3 charging and discharge at 30° C. The results are shown in FIG. 6 where it is evident that the battery cell using the disordered rocksalt of Example 1 displays improved cycle life compared to the battery cell using the disordered rocksalt of Comp. Ex. 1.

What is claimed is:

1. A method comprising:
mixing a lithium compound with a metal precursor compound comprised of Mn having an oxidation state of 2, wherein at least 50% by weight of the Mn has an oxidation state of 2 to form a mixture and heating the mixture to a temperature to form a disordered rocksalt.

2. The method of claim 1, wherein the metal precursor is comprised of MnO.

3. The method of claim 1, wherein the metal precursor compound is a mixed metal oxide intermediate comprised of Mn having the 2 oxidation state, said mixed metal oxide being formed by a method comprising:
mixing a Mn compound having an oxidation state greater than 2 with at least one other metal precursor compound to a temperature to form an intermediate precursor mixture,
and heating the intermediate precursor mixture in an intermediate atmosphere in the absence of lithium to an intermediate temperature to form the mixed metal oxide intermediate comprised of Mn having the 2 oxidation state.

4. The method of claim 3, wherein the Mn compound having an oxidation state of greater than 2 is $Mn_2O_3$.

5. The method of claim 3, wherein the intermediate atmosphere is air.

6. The method of claim 3, wherein the intermediate temperature is from 500° C. to 1200° C. and the intermediate temperature is held for a time from 10 minutes to 24 hours.

7. The method of claim 6, wherein the temperature is held at two or more differing temperatures.

8. The method of claim 1, wherein the heating is performed in an atmosphere essentially devoid of oxygen.

9. The method of claim 1, wherein the mixing of the lithium compound and metal precursor compound comprises comminuting the lithium compound and metal precursor compound together.

10. The method of claim 1, wherein the disordered rocksalt having a formula (i):

$$Li_xN_yM_zO_{2-a}F_a \qquad (i)$$

where $1.0<x<1.65$; $0\leq y<0.55$; $0.1<z<1$; $0\leq a<0.5$; N is one of Ti, Ta, Zr, W, Nb, or Mo; and M is Mn and one or more of Ti, V, Cr, Fe, Co, Ni, Cu, Zn, Al, Zr, Y, Mo, Ru, Rh, Sn, Bi or Sb.

11. A disordered rocksalt having a metal redox capacity and an oxygen redox capacity, wherein the metal redox capacity is greater than the oxygen redox capacity and the disordered rocksalt is comprised of Mn and at least 50% by weight of the Mn is present in the 2+ valence state.

12. The disordered rocksalt of claim 11, wherein the metal redox capacity is at least 10% greater than the oxygen redox capacity.

13. The disordered rocksalt of claim 11, wherein the disordered rocksalt having a formula (i):

$$Li_xN_yM_zO_{2-a}F_a \qquad (i)$$

where $1.0<x<1.65$; $0\leq y<0.55$; $0.1<z<1$; $0\leq a<0.5$; N is one of Ti, Ta, Zr, W, Nb, or Mo; and M is Mn and one or more of Ti, V, Cr, Fe, Co, Ni, Cu, Zn, Al, Zr, Y, Mo, Ru, Rh, Sn, Bi or Sb.

14. The disordered rocksalt of claim 13, wherein "a" is zero.

15. The disordered rocksalt of claim 13, wherein N is Nb and M is Mn and Ti and Mn and Ti are each present in an amount such that Mn/Ti in moles is 1 to 10.

16. A cathode comprised of the disordered rocksalt of claim 11.

17. The cathode of claim 16, further comprised of carbon wherein the disordered rocksalt and carbon are each present in an amount such that the amount of disordered rocksalt/amount of the carbon by weight is a ratio of 100/1 to 1.5/1.

18. A composition comprising a disordered rocksalt comprised of Li, Mn, and O, wherein at least 50% by weight of the Mn present is in a 2+ valence state.

19. The composition of claim 18, wherein at least 75%, by weight of the Mn present is in the 2+ valence state.

20. The composition of claim 18, wherein the disordered rocksalt having a formula (i):

$$Li_xN_yM_zO_{2-a}F_a \qquad (i)$$

where $1.0<x<1.65$; $0\leq y<0.55$; $0.1<z<1$; $0\leq a<0.5$; N is one of Ti, Ta, Zr, W, Nb, or Mo; and M is Mn and one or more of Ti, V, Cr, Fe, Co, Ni, Cu, Zn, Al, Zr, Y, Mo, Ru, Rh, Sn, Bi or Sb.

* * * * *